(12) United States Patent
Oh

(10) Patent No.: US 12,533,962 B2
(45) Date of Patent: *Jan. 27, 2026

(54) METHOD OF CONTROLLING TORQUE OF DRIVE SYSTEM OF ELECTRIC VEHICLE

(71) Applicants: Hyundai Motor Company, Seoul (KR); Kia Corporation, Seoul (KR)

(72) Inventor: Ji Won Oh, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 263 days.

This patent is subject to a terminal disclaimer.

(21) Appl. No.: 18/221,188

(22) Filed: Jul. 12, 2023

(65) Prior Publication Data
US 2024/0317066 A1  Sep. 26, 2024

(30) Foreign Application Priority Data
Mar. 22, 2023  (KR) .......................... 10-2023-0037017

(51) Int. Cl.
| | | |
|---|---|---|
| *B60L 15/20* | (2006.01) | |
| *B60K 23/08* | (2006.01) | |
| *B60L 7/10* | (2006.01) | |
| *F16H 57/12* | (2006.01) | |

(52) U.S. Cl.
CPC .......... *B60L 15/20* (2013.01); *B60K 23/0808* (2013.01); *B60L 7/10* (2013.01); *B60L 2240/14* (2013.01); *B60L 2240/18* (2013.01); *B60L 2240/22* (2013.01); *B60L 2240/24* (2013.01); *B60L 2240/423* (2013.01);
(Continued)

(58) Field of Classification Search
CPC ........ B60L 15/20; B60L 7/10; B60L 2240/14; B60L 2240/18; B60L 2240/22; B60L 2240/24; B60L 2240/423; B60L 2250/26; B60L 2250/28; B60L 2260/28; B60L 2220/42; B60L 2240/463; B60L 2260/20; B60L 2270/14; B60K 23/0808; B60K 2001/001; B60K 17/354; B60K 17/356; F16H 2057/123; B60Y 2200/91
See application file for complete search history.

(56) References Cited

U.S. PATENT DOCUMENTS 11,840,235 B1 * 12/2023 Lee ................ B60W 30/18145
2017/0334432 A1  11/2017 Kawai et al.
2018/0162365 A1   6/2018 Kim et al.
(Continued)

FOREIGN PATENT DOCUMENTS

JP  2008-024022 A  2/2008
JP  2008-167612 A  7/2008
(Continued)

*Primary Examiner* — Kyle J Kingsland
(74) *Attorney, Agent, or Firm* — Morgan Lewis & Bockius LLP

(57) ABSTRACT

A method of controlling torque of a drive system of an electric vehicle includes determining, by a controller, required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined.

19 Claims, 7 Drawing Sheets

(52) U.S. Cl.
CPC ....... *B60L 2250/26* (2013.01); *B60L 2250/28* (2013.01); *B60L 2260/28* (2013.01); *F16H 2057/123* (2013.01)

(56) References Cited

U.S. PATENT DOCUMENTS

| | | | |
|---|---|---|---|
| 2019/0293172 A1* | 9/2019 | Shinohara | B60K 17/02 |
| 2020/0231048 A1* | 7/2020 | Gauthier | B60L 15/34 |
| 2020/0391598 A1* | 12/2020 | Lee | H02P 6/08 |
| 2021/0023944 A1* | 1/2021 | Ravichandran | B60K 23/0808 |
| 2022/0135021 A1 | 5/2022 | Furuta et al. | |
| 2025/0065881 A1* | 2/2025 | Shen | B60W 30/20 |

FOREIGN PATENT DOCUMENTS

| | | |
|---|---|---|
| JP | 2017-105442 A | 6/2017 |
| JP | 2018-095246 A | 6/2018 |
| KR | 10-1448746 B | 10/2014 |
| KR | 10-1704243 B | 2/2017 |
| KR | 2022-0096746 A | 7/2022 |

* cited by examiner

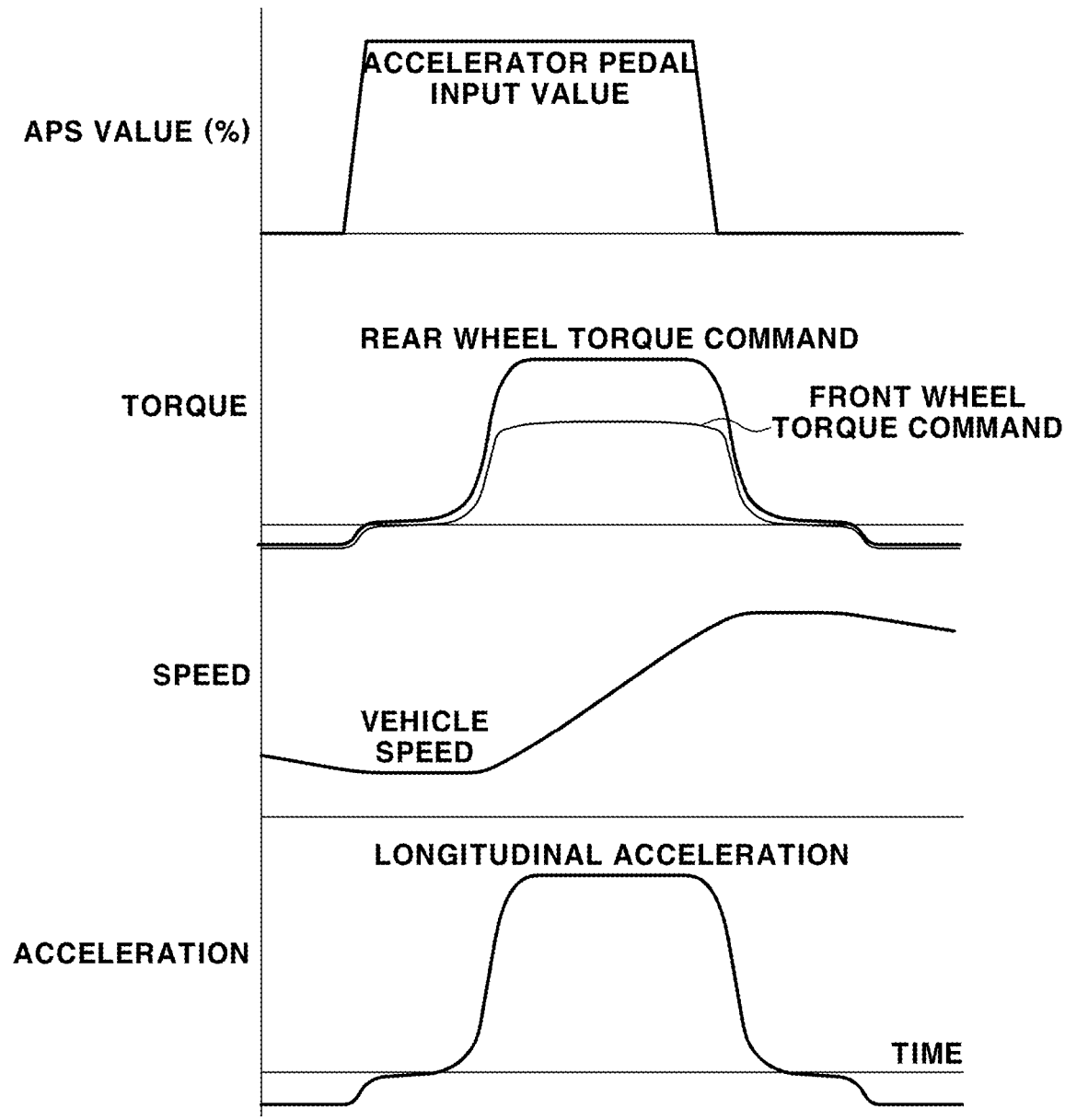

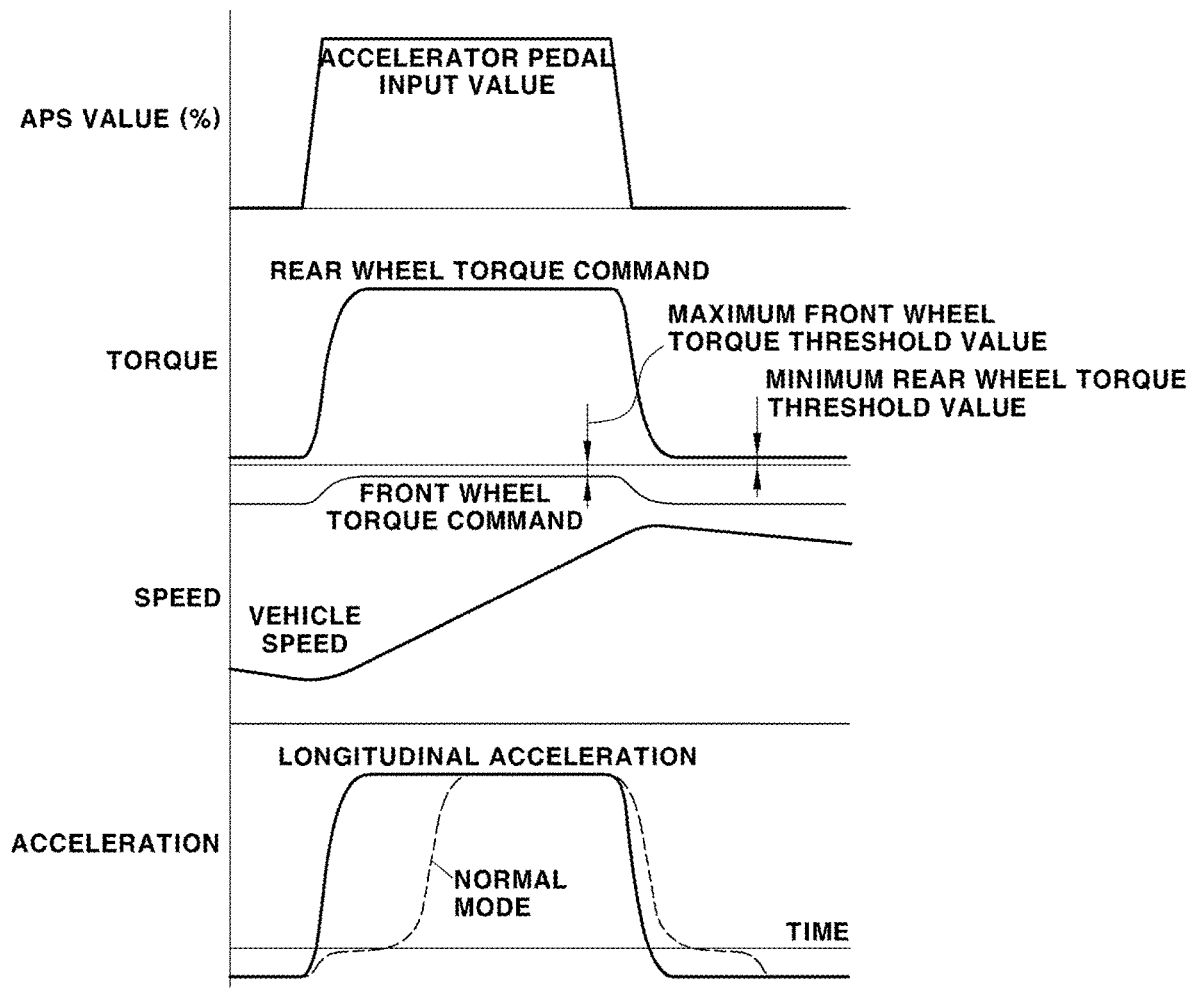

METHOD OF CONTROLLING TORQUE OF DRIVE SYSTEM OF ELECTRIC VEHICLE

CROSS-REFERENCE TO RELATED APPLICATION

The present application claims priority to Korean Patent Application No. 10-2023-0037017 filed on Mar. 22, 2023, the entire contents of which is incorporated herein for all purposes by this reference.

BACKGROUND OF THE PRESENT DISCLOSURE

Field of the Present Disclosure

The present disclosure relates to a method of controlling torque of a drive system of an electric vehicle. More particularly, it relates to a torque control method capable of generating torque by evading a backlash band of a drive system in an electric vehicle.

Description of Related Art

In general, the drive system of a vehicle needs to generate appropriate torque according to a torque command determined by a driving input value of a driver (for example, an accelerator pedal input value, a brake pedal input value, etc.) or a request of an advanced driver assistance system (ADAS).

At the present time, when a torque change rate is set to be excessively high, there may be problems such as driveshaft torsion, gear backlash hit, or impulsive drivability deterioration due to rapidly changing torque.

Conversely, when the torque change rate is excessively small, it takes excessive time for the driver or an ADAS controller to provide the required torque, and actual behavior of the vehicle differs from intention of the driver, causing frustrating responsiveness or dangerous situations.

Accordingly, there is a trade-off between a degree of reduction in noise, vibration, and harshness (NVH) in the vehicle due to rapid torque change and a degree of ensuring acceleration/deceleration responsiveness of the vehicle.

In current mass-produced vehicles, slope limiting and filters using various conditions as factors are used to generate optimal torque commands capable of solving such trade-off.

Furthermore, in an electrified vehicle using a motor as a driving source or a part thereof, active feedback torque compensation control configured for suppressing vibration that has previously occurred using a motor may be applied.

However, even when advanced backlash post-correction control is applied, it is difficult to suppress a problem of deterioration in vehicle responsiveness, which inevitably occurs chronically due to characteristics of hardware. Moreover, NVH issues due to backlash frequently occur in an electric vehicle having few vibration damping elements in a drive system.

Generally, there is a method of generating a model speed of a drive shaft using a disturbance observer and reducing vibration using a deviation between the model speed and an actual speed of the driveshaft. Further, there is a method of calculating a model speed based on a wheel speed instead of the disturbance observer in determining the model speed.

Furthermore, there is a method of generating a model speed of a motor using an input torque model and reducing vibration using a deviation between the model speed and an actual speed of the motor.

Furthermore, there is a method of estimating a speed of a drive system using a torque model and determining a slope of a torque command using a difference between an actual speed and the estimated speed of the drive system.

However, all of the above conventional technologies only suggest a torque compensation method for reducing and suppressing vibration generated in a drive system, and fail to suggest a torque determination method capable of preventing occurrence of vibration itself in advance.

Therefore, in relation to the backlash of the drive system, there is a demand for a control method capable of generating a torque command by evading a backlash band in which backlash of the drive system may occur, rather than a control method that alleviates a problem caused by the backlash.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque command generation and torque control method for a drive system of an electric vehicle configured for generating torque by evading a backlash band to prevent backlash from occurring in the drive system.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling torque of a drive system of an electric vehicle, the method including determining, by a controller, required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined, wherein the front wheel torque command is determined as a value less than or equal to a maximum front wheel torque threshold value set as a negative (−) torque value, and the rear wheel torque command is determined as a value greater than or equal to a minimum rear wheel torque threshold value set as a positive (+) torque value.

Other aspects and exemplary embodiments of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure. The above and other features of the present disclosure are discussed infra.

BRIEF DESCRIPTION OF THE DRAWINGS

FIG. 4A is a diagram illustrating a control state when the responsiveness priority mode is turned off according to various exemplary embodiments of the present disclosure;

FIG. 4B is diagram illustrating a control state when the responsiveness priority mode is turned on according to various exemplary embodiments of the present disclosure

Figure 1:
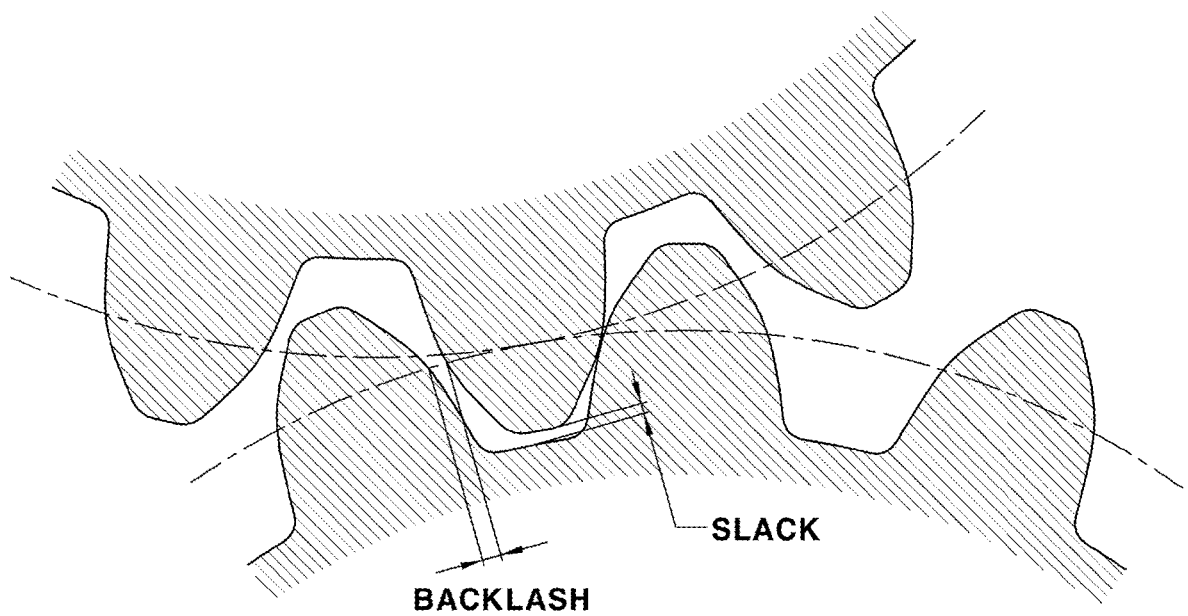
FIG. 1 is a diagram illustrating backlash.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail with reference to the accompanying drawings. Specific structural or functional descriptions presented in the exemplary embodiments of the present disclosure are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method of controlling torque of a drive system of an electric vehicle, and relates to a torque command generation and torque control method configured for generating a torque command by evading a backlash band in which backlash may occur so that occurrence of backlash in the drive system may be prevented rather than a control method for mitigating a problem caused by backlash in the drive system.

In an exemplary embodiment of the present disclosure, a backlash band may be defined as a torque region in which backlash may occur in a drive system of a vehicle. Here, the drive system of the vehicle includes drive elements such as a driveshaft between a drive device and drive wheels, a reducer, a differential, and an axle in addition to the drive device and the drive wheels for driving the vehicle.

In an exemplary embodiment of the present disclosure, "torque" encompasses both driving torque for accelerating the vehicle and braking torque for decelerating the vehicle. Herein, "braking torque" (deceleration torque) refers to regenerative torque by a motor.

Unless otherwise specified in the present specification as being divided into driving torque and braking torque, torque may be a driving torque for accelerating the vehicle (acceleration situation) or a braking torque for decelerating the vehicle (deceleration situation) depending on the driving situation of the vehicle.

In an exemplary embodiment of the present disclosure, the driving torque and a driving torque command each include a torque value for accelerating the vehicle, which is defined as a positive (+) torque value. On the other hand, the braking torque and the braking torque command each include a torque value for decelerating the vehicle, which is defined as a negative (−) torque value.

In the following description, when a front wheel torque command and a rear wheel torque command indicate negative (−) values, both the front wheel torque command and the rear wheel torque command indicating the negative (−) values refer to regenerative torque commands.

As described above, when the vehicle is driving, positive (+) torque, which is forward torque, or negative (−) torque, which is reverse torque, is applied to the drive system depending on whether the vehicle is accelerating or decelerating, and a direction of the torque applied from the motor to the drive system and transmitted through the drive system may change depending on the driving situation of the vehicle.

The present disclosure has been generated based on the principle that a problem caused by backlash in the drive system of the vehicle mainly occur only in a torque region close to 0, and the torque region close to 0 may be referred to as a backlash band where a backlash problem may occur.

In an exemplary embodiment of the present disclosure, the backlash band may be set to a torque range bordering a lower threshold value, which is a negative (−) value, and an upper limit threshold value, which is a positive value (+). That is, the backlash band may be set to a torque range including 0, and a backlash state may occur when input torque applied from the motor, which is the drive device, to the drive system enters the set backlash band.

Backlash is a tolerance that exists between meshing teeth of two gears as illustrated in FIG. 1. Between two meshed gears, vibration or noise may occur as gear teeth strike each other due to backlash, and in the worst case, backlash may cause gear damage.

When torque is continuously applied in one direction, one of the two meshed gears continues to transmit force to the other in the same direction. Thus, the teeth of the two meshed gears are aligned and meshed in a forward direction, and at the instant time, a problem due to backlash tolerance does not occur.

However, when the direction of the torque is changed, the teeth of the gear reversely align after experiencing a backlash tolerance as a direction of force transmission is reversed. At the instant time, after alignment in the reverse direction is performed, while the force in the same direction is continuously transmitted, meshing of the gears is not released again, and thus a problem due to backlash does not occur.

However, at the moment when the direction of the transmitted force is changed again, a problem due to backlash occurs when meshing between the teeth of the two gears is released and then meshing is performed again while passing the meshing tolerance. Therefore, a core of a method for not causing the backlash problem is to eliminate or minimize a situation of releasing gear engagement, which may be achieved by eliminating or minimizing a direction change of a torque command with respect to the drive device such as the motor.

Furthermore, to minimize the direction change of the torque command as described above, front and rear wheel drive devices, that is, a front wheel motor and a rear wheel motor, need to share functions.

Figure 2:
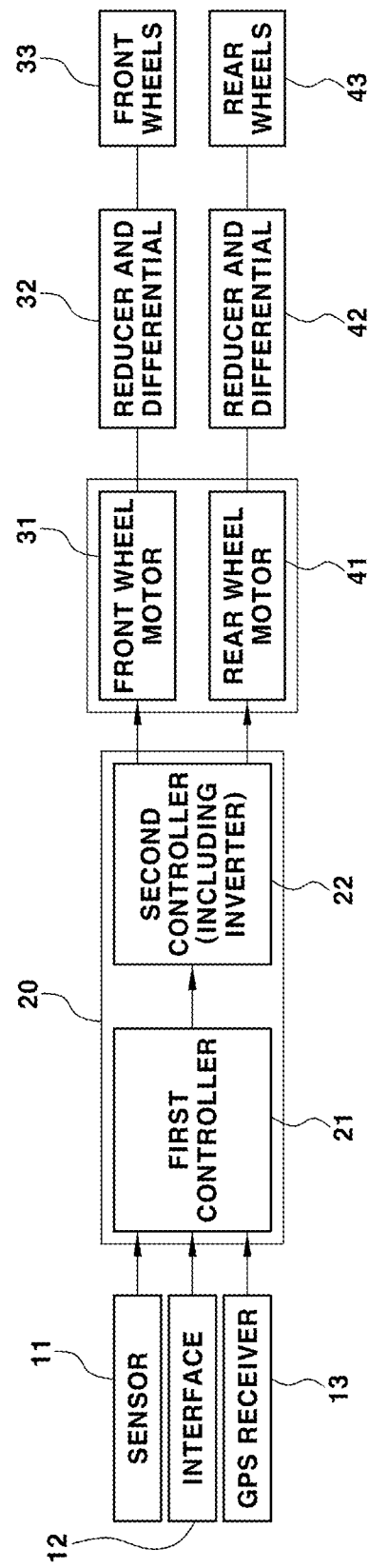
FIG. 2 is a block diagram illustrating a configuration of a device for performing a drive system torque control process according to various exemplary embodiments of the present disclosure.
Figure 3:
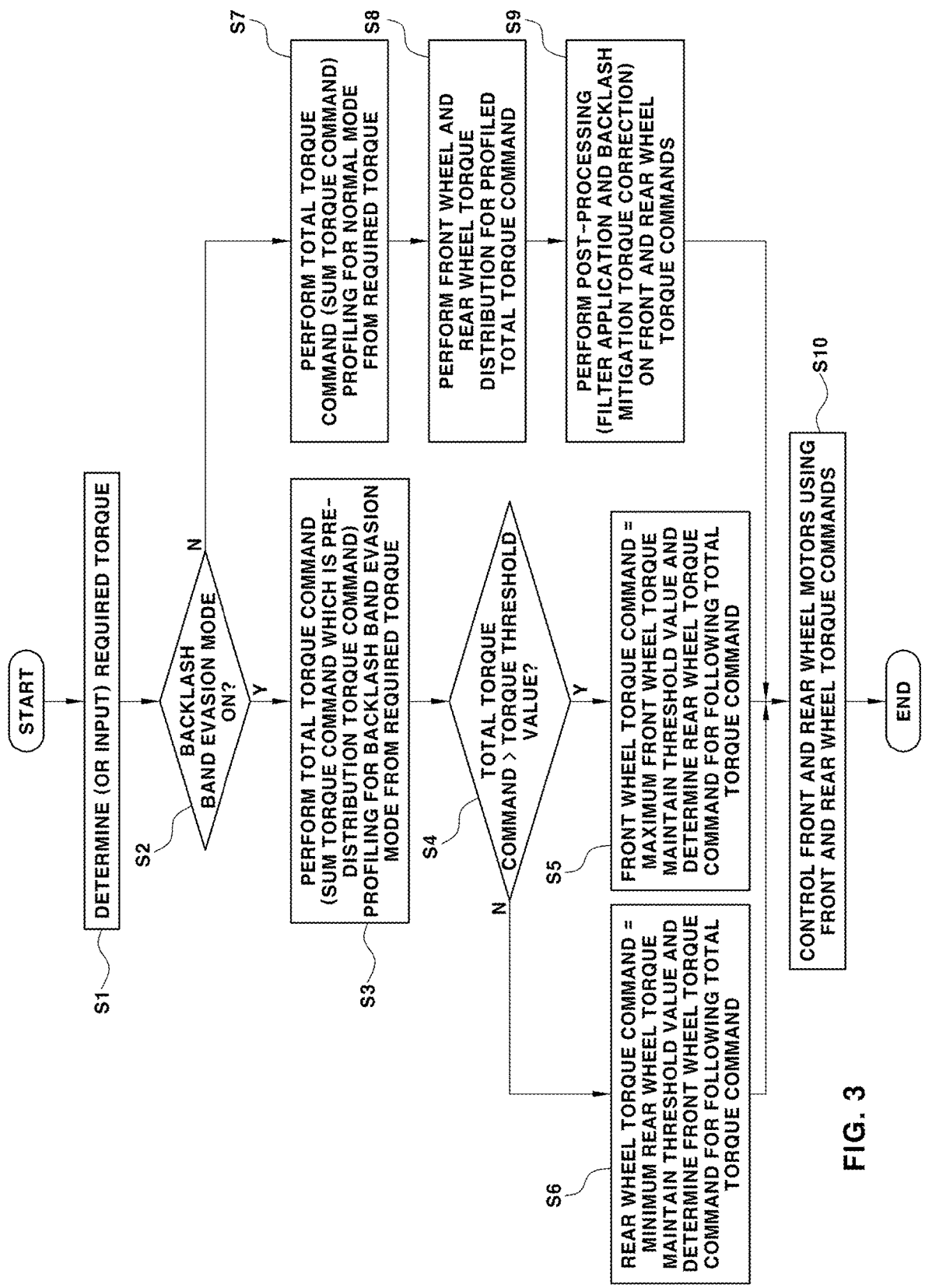
FIG. 3 is a flowchart illustrating the drive system torque control process according to various exemplary embodiments of the present disclosure.

FIG. 2 is a block diagram illustrating a configuration of a device for performing a drive system torque control process according to various exemplary embodiments of the present disclosure, and FIG. 3 is a flowchart illustrating the drive system torque control process according to various exemplary embodiments of the present disclosure.

The present disclosure may be applied to a vehicle provided with a plurality of drive devices, and may be applied to a vehicle in which front wheels 33 and rear wheels 43 are driven by independent drive devices, respectively. Furthermore, the present disclosure may be applied to an electric vehicle that runs using motors 31 and 41 as the drive devices.

The present disclosure may be applied to a vehicle provided with a front wheel drive device for applying torque to the front wheels 33 and a rear wheel drive device for applying torque to the rear wheels 43. Furthermore, the present disclosure may be applied to a vehicle in which both the front wheel drive device and the rear wheel drive device are motors. In the following description, the motor 31 driving the front wheels 33 will be referred to as a "front wheel motor" and the motor 41 driving the rear wheels 43 will be referred to as a "rear wheel motor".

Referring to FIG. 2, the front wheel motor 31 and the rear wheel motor 41 are illustrated as drive devices of the electric vehicle. The front wheel motor 31 and the rear wheel motor 41 are connected to the front wheels 33 and the rear wheels 43 provided as drive wheels through drive system elements such as reducers, differentials 32 and 42, and axles, respectively, so that power may be transmitted.

Accordingly, torque output from the front wheel motor 31 and the rear wheel motor 41 may be transmitted to the front wheels 33 and the rear wheels 43 through drive system elements such as the reducers, the differentials 32 and 42, and the axles, respectively.

Furthermore, although not separately illustrated in FIG. 2, a battery is connected to the front wheel motor 31 and the rear wheel motor 41 via an inverter so that the battery may be charged and discharged. The inverter may include a front wheel inverter for driving and controlling the front wheel motor 31 and a rear wheel inverter for driving and controlling the rear wheel motor 41.

In the electric vehicle, operations (driving and regeneration) of the front wheel motor 31 and the rear wheel motor 41 are controlled according to torque commands generated by a controller 20. At the instant time, the controller 20 is configured to determine required torque according to a vehicle driving state to drive the vehicle, and generates a final torque command (total torque command) based on the determined required torque.

Furthermore, the controller 20 is configured to control the operations of the front wheel motor 31 and the rear wheel motor 41 through the inverter according to the final torque command. In the following description, when the torque command is a positive (+) value, the torque command is defined as a driving torque command, and when the torque command is a negative (−) value, the torque command is defined as a regenerative torque command.

Furthermore, the final torque command is a pre-distribution torque command before torque distribution to the front and rear wheels, and in the following description, pre-distribution torque command, sum torque command, and total torque command are used interchangeably.

In an exemplary embodiment of the present disclosure, the controller 20 may include a first controller 21 that is configured to determine required torque based on a driving input value of the driver or receives required torque from another controller such as an ADAS controller, and generates and outputs a final torque command based on the required torque, and a second controller 22 that is configured to control the operations of the front wheel motor 31 and the rear wheel motor 41 according to the final torque command input from the first controller 21.

The first controller 21 may be a vehicle control unit (VCU) that is configured to determine and generates a torque command for controlling an operation of a motor in a typical vehicle. Because a method and process for determining a torque command in a vehicle are well-known technical matters in the field of the present disclosure, a detailed description thereof will be omitted.

Furthermore, the first controller 21 may be configured to determine the front wheel torque command and the rear wheel torque command from the final torque command through a front wheel and rear wheel torque distribution process. Accordingly, when the front wheel torque command and the rear wheel torque command are output from the first controller 21, the second controller 22 receives the front wheel torque command and the rear wheel torque command, and operates the front wheel motor 31 and the rear wheel motor 41 through the front wheel inverter and the rear wheel inverter.

The second controller 22 may be a general motor control unit (MCU) that is configured to control an operation of a driving motor through the inverter according to a torque command output from the VCU in the electric vehicle.

In the above description, a control subject includes the first controller 21 and the second controller 22. However, the torque control process according to an exemplary embodiment of the present disclosure may be performed by one integrated control element instead of a plurality of controllers.

A plurality of controllers and one integrated control element may be collectively referred to as a controller, and the torque control process according to an exemplary embodiment of the present disclosure described below may be performed by the present controller.

In an exemplary embodiment of the present disclosure, vehicle driving information, such as a driving input value of the driver input to the controller 20, is information indicating a vehicle driving state, and may include sensor detection information detected by a sensor 11 and input to the controller through a vehicle network.

At the present time, the sensor 11 for detecting the vehicle driving information may include an accelerator position sensor (APS) for detecting an accelerator pedal input value (APS value, %) of the driver, a brake pedal position sensor (BPS) for detecting a brake pedal input value (BPS value, %) of the driver, a sensor configured for detecting a drive system speed, and a sensor configured for detecting a vehicle speed.

Here, the drive system speed may be a rotation speed of the front wheel motor 31 and the rear wheel motor 41, which are driving motors, or a rotation speed (wheel speed) of the drive wheels 33 and 43. At the instant time, the sensor configured for detecting the drive system speed may be a sensor configured for detecting the rotation speed of each of the motors 31 and 41, which may be a normal resolver for detecting a rotor position of the motor. Alternatively, the sensor configured for detecting the drive system speed may be a wheel speed sensor configured for detecting the rotation speed (wheel speed) of the drive wheels 33 and 43.

Furthermore, the sensor configured for detecting the vehicle speed may also be a wheel speed sensor. Obtaining the vehicle speed information from a signal of the wheel speed sensor is a well-known technical matter in the field of the present disclosure, and thus a detailed description thereof will be omitted.

The accelerator pedal input value (APS value, %) of the driver, the brake pedal input value (BPS value, %) of the driver, the speed (rotation speed) of the drive motors 31 and 41, the vehicle speed, etc. may be selectively used as the vehicle driving information for determining and generating the required torque and torque command in the controller 20, which is detected by the sensor 11.

In the vehicle driving information, the accelerator pedal input value and the brake pedal input value, which are pedal input values of the driver, may be referred to as driving input information of the driver, and the speed and vehicle speed of the driving motor detected by the sensor 11 may be referred to as vehicle state information.

Furthermore, the vehicle driving information may include information independently determined by the controller 20 in a broad sense, and furthermore, may include information (for example, required torque information) input to the controller 20 from another controller (for example, the ADAS controller) in the vehicle through the vehicle network.

In FIG. 2, reference numeral 12 denotes an interface connected to the controller 20 in the vehicle, and the interface 12 may include an input device and an output device. In an exemplary embodiment of the present disclosure, the interface 12 is provided to enable driver operation, input, selection, and display of various information, and may be used to perform an ON/OFF operation of a responsiveness priority mode (a backlash band evasion mode) described later, or provide various user interfaces (UIs).

In an exemplary embodiment of the present disclosure, the input device and the output device of the interface 12 may be selected from known devices so long as the input device and the output device can perform the ON/OFF operation of the responsiveness priority mode, and input or display various information.

For example, the interface 12 may include an operating device such as a button or switch provided in the vehicle, an input device or a display device of an audio, video, navigation (AVN) system, or a touch screen.

In FIG. 2, reference numeral 13 denotes a Global Positioning System (GPS) receiver mounted on the vehicle and connected to the controller 20, and the GPS receiver 13 is provided to receive a GPS signal indicating a current vehicle location from outside the vehicle.

In addition, the GPS receiver 13 is provided to input the received GPS signal to the controller 20. Thus, the controller 20 may decide and determine the current vehicle location in real time from the GPS signal received and input through the GPS receiver 13.

Meanwhile various aspects of the present disclosure are directed to providing a method configured for generating a torque command by evading the backlash band in which backlash in the drive system may occur. Here, evasion of the backlash band means maximally preventing a situation in which the torque command invades the backlash band.

This may be achieved by a method in which front wheel torque (which means actual torque) and a front wheel torque command maintain only negative (−) torque values, and rear wheel torque (which means actual torque) and a rear wheel torque command maintain only positive (+) torque values because the backlash issue is characterized by occurring when the direction of torque is changed as mentioned earlier.

When the present control method is applied, the rear wheel motor 41 side continuously aligns gears in a positive (+) torque transmission direction in order not to enter the backlash band, which may be achieved by continuously generating at least a small amount of positive (+) directional torque.

At the present time, the small amount of positive (+) directional torque for continuously aligning the gears in the positive (+) torque transmission direction may be defined as a minimum rear wheel torque threshold value (which is a positive value), and accordingly, a value of the rear wheel torque command (which is a positive value) is determined in a region equal to or greater than the preset minimum rear wheel torque threshold value.

Similarly, the front wheel motor 31 side continuously aligns gears only in a negative (−) torque transmission direction so as not to enter the backlash band, which may be achieved by continuously generating at least a small amount or more negative (−) directional torque.

At the present time, the small amount of negative (−) directional torque for continuously aligning the gears in the negative (−) torque transmission direction may be defined as a maximum front wheel torque threshold value (which is a negative value), and a value of the front wheel torque command (negative value) is determined in a region equal to or less than the preset maximum front wheel torque threshold value.

In an exemplary embodiment of the present disclosure, the minimum rear wheel torque threshold value is set in the controller 20 as a torque value outside the backlash band, which is a torque region in which backlash may occur in the rear wheel drive system. That is, the minimum rear wheel torque threshold value may be set to a value greater than an upper limit threshold value of the backlash band of the rear wheel drive system.

Similarly, the maximum front wheel torque threshold value is set in the controller 20 as a torque value outside the backlash band, which is a torque region where backlash may occur in a front wheel drive system. At the instant time, the maximum front wheel torque threshold value may be set in the controller 20 to a value smaller than a lower limit threshold value of the backlash band of the front wheel drive system.

However, a problem which may occur in the present method is that, because only a motor of one of a front axle and a rear axle is used for acceleration and regenerative braking (deceleration), maximally generated output may be insufficient when compared to the case in which both axle motors are used for all purposes.

That is, because only one of the front wheel motor 31 and the rear wheel motor 41 is used, the maximally generated output may be insufficient when compared to the case in which both the front wheel motor 31 and the rear wheel motor 41 are used for acceleration or for regenerative braking. As a result, it may be difficult to exhibit maximum acceleration performance or maximum regenerative braking.

However, considering the principle in which load movement is concentrated on the rear wheel side, and thus torque of the rear axle performs a main function during acceleration, and conversely, load movement is concentrated on the front wheel side, and thus regenerative torque of the rear axle performs a main function during deceleration, it may be seen that the backlash band evasion strategy provided in an exemplary embodiment of the present disclosure does not result in significantly large performance degradation.

Nevertheless, because it is certain that, when only one axle motor is used, maximum performance which may be exhibited when both axle motors are used together cannot be reached, the following countermeasures may be considered to overcome these limitations.

First, the responsiveness priority mode may be set in the controller 20, and the responsiveness priority mode may be regarded as a backlash band evasion mode in which backlash band evasion control is performed. On and OFF states of the responsiveness priority mode (backlash band evasion mode) may be selected by the driver operating the interface 12. That is, the driver may turn on or off the responsiveness priority mode by use of the interface 12 connected to the controller 20.

FIG. 4A is a diagram illustrating a control state of a normal mode in which the responsiveness priority mode is turned off according to various exemplary embodiments of the present disclosure, and FIG. 4B is diagram illustrating a control state in which the responsiveness priority mode is turned on according to various exemplary embodiments of the present disclosure.

FIG. 4A and FIG. 4B illustrate a front wheel and rear wheel torque distribution state and a front wheel and rear wheel torque command determination method when the responsiveness priority mode is turned off and when the responsiveness priority mode is turned on, respectively, when the controller 20 detects the accelerator pedal input value.

In an exemplary embodiment of the present disclosure, the normal mode may be selected when the driver turns off the responsiveness priority mode through the interface 12, and the responsiveness priority mode may be selected when an ON state is input through the interface 12. The normal mode has no difference compared to a conventional torque control mode.

The controller 20 is configured to determine the required torque by itself or receives the requested torque from another controller (step S1 in FIG. 3) as in the case of normal drive system torque control, and verifies whether the backlash band evasion mode (responsiveness priority mode) is turned off by the driver (step S2 in FIG. 3).

At the present time, when the backlash band evasion mode (responsiveness priority mode) is turned off, the controller 20 profiles the total torque command in the normal mode (step S7 in FIG. 3).

In an exemplary embodiment of the present disclosure, profiling the total torque command (sum torque command and pre-distribution torque command) and determining a final total torque command based on the required torque may be understood as having the same meaning.

Hereinafter, in the description of the present disclosure, the sum torque command means the total torque command, which is the pre-distribution torque command, and means the torque command obtained by summing the front wheel torque command and the rear wheel torque command (command including the summed torque value). In an exemplary embodiment of the present disclosure, a torque command for each wheel and a torque command for each axle refer to the front wheel torque command and the rear wheel torque command.

Furthermore, in the description of the present disclosure, invasion or entry into the backlash band means when the torque value of the corresponding torque command becomes a torque value within the backlash band, and passing through the backlash band means that the torque value of the torque command invades the backlash band outside the backlash band and then continuously increases or decreases, thus escaping the backlash band again.

The normal mode is a mode determined and operated in all torque ranges of positive (+) and negative (−) values according to the sum torque command, which is the pre-distribution torque command, to satisfy the required torque by the torque applied by the front wheel motor and the rear wheel motor.

For example, in the normal mode in which the backlash band evasion mode (responsiveness priority mode) is turned off, when there is no input of the accelerator pedal by the driver, that is, in a vehicle deceleration section in which the driver does not depress the accelerator pedal, both the front wheel torque command and the rear wheel torque command may be determined as negative (−) torque values.

Accordingly, when the driver depresses the accelerator pedal to accelerate the vehicle, both the front wheel torque command and the rear wheel torque command in the normal mode are switched from negative (−) torque values to positive (+) torque values. When a torque direction is changed in the present way, each of the front wheel torque command and the rear wheel torque command inevitably passes through the backlash band.

While passing through the backlash band in the present way, even when the driver depresses the accelerator pedal, the direction of the torque applied from the motor to the drive system is not rapidly changed so that the backlash problem may be minimized.

That is, as may be seen in FIG. 4A, the front wheel torque command and the rear wheel torque command are not switched from negative (−) torque to positive (+) torque immediately after the driver depresses the accelerator pedal, and the front wheel torque command and the rear wheel torque command are determined so that the torque applied to the drive system by the motor may change direction while passing through the backlash band for a predetermined time period after the accelerator pedal is depressed (step S8 in FIG. 3).

During a time when the backlash band is passed through as described above, torque slope control is performed to limit slopes of the front wheel torque command and the rear wheel torque command, so that the torque command is not rapidly increased. Backlash control is performed so that a gentle torque change is made in the backlash band for each of the front wheel torque command and the rear wheel torque command.

To the present end, a maximum permissible rate of change in the backlash band for the front wheel torque command and the rear wheel torque command is set in the controller 20 to a small value that does not cause backlash impact.

Accordingly, while the front wheel torque command and the rear wheel torque command increase and pass through the backlash band, the front wheel torque command and the rear wheel torque command are determined in the controller 20 to values that gradually change according to the maximum permissible rate of change of the small value.

Furthermore, the front wheel torque command and the rear wheel torque command after passing through the backlash band are determined to have sizes allowing driving torque required for acceleration to be satisfied through the front wheel and rear wheel torque distribution process (step S8 in FIG. 3).

As described above, in normal mode, when the driver depresses the accelerator pedal to accelerate, both the front wheel torque command and the rear wheel torque command are switched from negative (−) torque values to positive (+) torque values, and when the torque direction is changed, both the front wheel torque command and the rear wheel torque command pass through the backlash band.

In the normal mode, backlash control is performed to limit the slope to a maximum permissible rate of change for both the front wheel torque command and the rear wheel torque command to minimize the problem caused by backlash, and thus acceleration delay of the vehicle inevitably occurs in the backlash band.

Furthermore, when the driver tips out the accelerator pedal while depressing the accelerator pedal, both the front wheel torque command and the rear wheel torque command in the normal mode are switched from positive (+) torque values to negative (−) torque values. Accordingly, even when the torque direction is reversely switched, each of the front wheel torque command and the rear wheel torque command inevitably passes through the backlash band.

Even though regenerative torque is required for coasting deceleration driving after tip-out of the accelerator pedal, the direction of torque applied from the motor to the drive system is not rapidly changed while passing through the backlash band so that the backlash problem may be minimized.

That is, as may be seen in FIG. 4A, the front wheel torque command and the rear wheel torque command are not switched from positive (+) torque to negative (−) torque immediately after the driver tips out the accelerator pedal, and the front wheel torque command and the rear wheel torque command are determined so that the torque applied to the drive system by the motor may change direction while passing through the backlash band for a predetermined time period after tip-out of the accelerator pedal (step S8 in FIG. 3).

In the present way, during a time when passing through the backlash band, torque slope control is performed to limit the slopes of the front wheel torque command and the rear wheel torque command, so that the torque commands are not rapidly decreased.

Backlash control is performed so that torque gradually changes in the backlash band for both the front wheel torque command and the rear wheel torque command. At the instant time, in the controller 20, the front wheel torque command and the rear wheel torque command are determined as values that gradually change according to the maximum permissible rate of change of the small value.

Furthermore, after passing through the backlash band, the controller 20 is configured to perform front wheel and rear wheel torque distribution so that regenerative torque required for coasting deceleration driving may be satisfied (step S8 in FIG. 3), and the front wheel torque command and the rear wheel torque command which may satisfy the regenerative torque command (pre-distribution torque command), which is the total torque command during coasting deceleration driving, are determined.

As described above, in the normal mode, when the driver tips-out the accelerator pedal and enters a coasting deceleration situation, both the front wheel torque command and the rear wheel torque command are switched from positive (+) torque values to negative (−) torque values, and both the front wheel torque command and the rear wheel torque command pass through the backlash band when the torque direction is switched. Accordingly, during tip-out of the accelerator pedal, deceleration delay is inevitable.

When the front wheel torque command and the rear wheel torque command are determined through the front wheel and rear wheel torque distribution in the normal mode, post-processing is performed on the determined front and rear wheel torque commands (Step S9 in FIG. 3), and a final front wheel torque command and a final rear wheel torque command are determined by applying a filter to the commands and performing backlash mitigation torque correction.

Subsequently, when the final front wheel torque command and the final rear wheel torque command are determined, the controller 20 is configured to control the front wheel motor 31 and the rear wheel motor 41 according to the determined final front wheel torque command and the determined final rear wheel torque command (step S10).

Next, a description will be given of torque control when the backlash band evasion mode (responsiveness priority mode) is turned on. First, the required torque is determined by the controller 20 itself, or the required torque is input to the controller 20 by another controller (step S1 in FIG. 3), and the controller 20 verifies whether the backlash band evasion mode (responsiveness priority mode) is turned on by the driver (step S2 in FIG. 3).

At the present time, when the backlash band evasion mode (responsiveness priority mode) is turned on, the controller 20 profiles total torque command to determine the total torque command for the backlash band evasion mode (step S3 in FIG. 3).

When the backlash band evasion mode (responsiveness priority mode) is turned on, a control operation is performed so that a direction of torque output by each of the front wheel motor 31 and the rear wheel motor 41 and delivered through the drive system is continuously maintained as the same direction without change for the entire range of the required torque regardless of the acceleration and deceleration situation of the vehicle.

At the present time, the front wheel torque command is determined as a negative (−) torque value at all times, and the rear wheel torque command is determined as a positive (+) torque value at all times. Accordingly, when the backlash band evasion mode is in an ON state, the front wheel motor 31 continuously applies negative (−) torque, and the rear wheel motor 41 continuously applies positive (+) torque to the drive system while the vehicle is driven.

In the present way, in the backlash band evasion mode, when the front wheel torque command is determined as a negative (−) torque value, and the rear wheel torque command is determined as a positive (+) torque value, a torque command obtained by summing the front wheel torque command and the rear wheel torque command is determined by the controller 20 to be a torque value following the total torque command (pre-distribution torque command) finally determined based on the required torque.

In a deceleration section where the vehicle is decelerating because the driver does not depress the accelerator pedal, the total torque command finally determined from the required torque (sum torque command as the pre-distribution torque command) is a regenerative torque command and includes a negative (−) torque value.

In the deceleration section where the vehicle is decelerating, the rear wheel torque command is determined as a value greater than or equal to the minimum rear wheel torque threshold value set as a positive (+) torque value, and at the instant time, the front wheel torque command is determined as a value obtained by subtracting the determined rear wheel torque command (positive torque) from the total torque command (negative torque), which is the pre-distribution torque command.

Referring to FIG. 3, the total torque command of step S3 is compared with the minimum rear wheel torque threshold value in step S4, and when the total torque command is less than or equal to the minimum rear wheel torque threshold value, the controller 20 is configured to determine the rear wheel torque command as the minimum rear wheel torque threshold value, and is configured to determine the remaining torque obtained by subtracting the minimum rear wheel torque threshold value from the total torque command as the front wheel torque command so that the total torque command may be followed in step S6.

The front wheel torque command determined in the instant way includes a negative (−) torque value. Accordingly, the rear wheel motor 41 outputs positive (+) torque and applies the positive (+) torque to the drive system, and the front wheel motor 31 outputs negative (−) torque and applies the negative (−) torque to the drive system.

Thereafter, when the driver depresses the accelerator pedal, the front wheel torque command may be determined as the maximum front wheel torque threshold value set as a negative (−) torque value immediately after the driver depresses the accelerator pedal. At the instant time, the rear wheel torque command is determined as a positive (+) torque value obtained by subtracting the determined front wheel torque command (negative torque) from the total torque command (positive torque) corresponding to the accelerator pedal input value.

Referring to FIG. 3, the total torque command of step S3 is compared with the minimum rear wheel torque threshold value in step S4, and when the total torque command is greater the minimum rear wheel torque threshold value, the controller 20 is configured to determine the front wheel torque command as the maximum front wheel torque threshold value, and is configured to determine the remaining torque obtained by subtracting the maximum front wheel torque threshold value from the total torque command as the rear wheel torque command so that the total torque command may be followed in step S5.

As a result, while the driver depresses the accelerator pedal, the front wheel motor 31 may output negative (−) torque corresponding to the maximum front wheel torque threshold value, and the rear wheel motor 41 outputs positive (+) torque obtained by subtracting the front wheel motor command (negative torque) from the total torque command (positive torque).

Thereafter, when there is tip-out in which the driver releases the accelerator pedal, the rear wheel torque command may be determined as the minimum rear wheel torque threshold value again, and the front wheel torque command is determined as a negative (−) torque value obtained by subtracting the rear wheel torque command (positive torque) from the total torque command (negative torque), which is regenerative torque.

As described above, even when the backlash band evasion mode (responsiveness priority mode) is turned on, the front wheel torque command and the rear wheel torque command are similarly distributed and determined to satisfy the total torque command.

When the front wheel torque command and the rear wheel torque command are determined in step S5 or S6 of FIG. 3, the controller 20 is configured to control the operations of the front wheel motor 31 and the rear wheel motor 41 according to the front wheel torque command and the rear wheel torque command (step S10).

In the present way, when the backlash band evasion mode is on, backlash band evasion control is executed in which each of the front wheel torque and the rear wheel torque does not pass through the backlash band, which is a torque range in which backlash may occur. Thus, while the vehicle is driven, the directions of the front wheel torque and the rear wheel torque are not reversed, and consequently, no problem due to backlash occurs.

Furthermore, as illustrated in FIG. 4B, because the vehicle may be accelerated immediately after the driver depresses the accelerator pedal, acceleration/deceleration responsiveness of the vehicle may be improved.

Next, a detailed description will be provided of an exemplary embodiment in which an on or OFF state of the backlash band evasion mode is selected according to the required load capacity of the vehicle.

Figure 5:
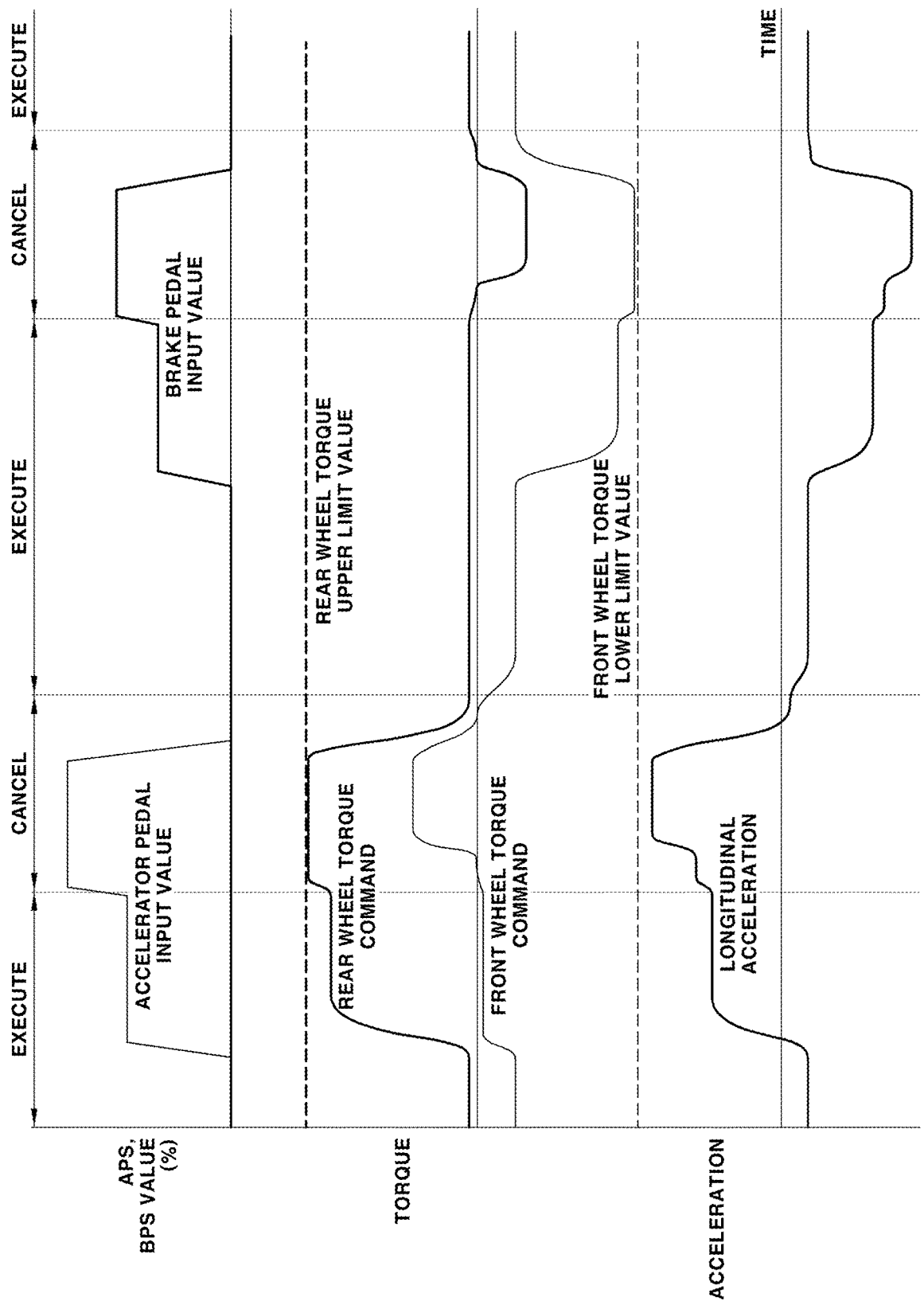
FIG. 5 is a diagram illustrating a state in which backlash band evasion control is selectively executed and canceled according to required load capacity in an exemplary embodiment of the present disclosure.

FIG. 5 is a diagram illustrating a state in which the ON/OFF of state the backlash band evasion mode is determined based on the required load capacity in an exemplary embodiment of the present disclosure.

As illustrated, the backlash band evasion control may be selectively executed or canceled according to the required load capacity, and the required load capacity may be used as a driving state variable for determining whether to execute the backlash band evasion control.

In various exemplary embodiments of the present disclosure, the required load capacity may be required torque determined based on an accelerator pedal input value (APS value) and a brake pedal input value (BPS value) detected by a sensor 12.

In the exemplary embodiment of FIG. 5, instead of allowing the driver to manually operate the interface 12 to turn on or off the responsiveness priority mode (backlash band evasion mode), the controller 20 automatically turns on or off the backlash band evasion mode according to information indicating the vehicle driving state, that is, the required load capacity, which is one piece of vehicle driving information.

Thereafter, in step S2 of FIG. 3, the controller 20 verifies whether the backlash band evasion mode is in the ON state, and then steps S3 and S7 of FIG. 3 and subsequent steps are performed as in the exemplary embodiment in which the driver is allowed to manually turn on or off the responsiveness priority mode.

That is, upon determining that the backlash band evasion mode is turned off according to the required load capacity in step S2, the controller 20 switches the backlash band evasion mode to the OFF state, and profiles the total torque command in the normal mode (step S7 in FIG. 3).

Furthermore, upon determining that the backlash band evasion mode is turned on according to the required load capacity in step S2, the controller 20 switches the backlash band evasion mode (responsiveness priority mode) to the ON state, profiles the total torque command to determine the total torque command for the backlash band evasion mode (step S3 in FIG. 3), and then may perform the backlash band evasion control of steps S4, S5, S6, and S10.

When the magnitude of motor torque required during vehicle driving, that is, the magnitude of the required torque exceeds the magnitude of maximum motor torque which is obtainable through the backlash band evasion control, a problem of performance degradation may occur.

That is, when a control operation is performed so that the front wheel motor 31 outputs negative (−) torque at all times and the rear wheel motor 41 outputs positive (+) torque at all times, there may be a problem that the required torque cannot be satisfied during vehicle acceleration even when the rear wheel motor 41 outputs maximum torque which may be output.

Accordingly, it is possible to determine whether or not to execute the backlash band evasion control based on the required load capacity (accelerator pedal input value and brake pedal input value) in consideration of the above description.

While the backlash band evasion control is executed, the rear wheel motor 41 is only responsible for generating positive (+) directional torque to provide a driving force for vehicle acceleration, and the front wheel motor 31 is only responsible for generating negative (−) directional torque to provide only torque for regenerative braking.

However, when the driving torque (acceleration torque) as the required torque exceeds magnitude (absolute value magnitude) of maximum positive (+) directional torque which may be output by the rear wheel motor 41, or regenerative torque (deceleration torque) as the required torque exceeds magnitude (absolute value magnitude) of maximum negative (−) directional torque which may be output by the front wheel motor 31, the backlash band evasion control may be temporarily canceled and suspended to switch to control of the existing normal mode. Execution and cancellation of the backlash band evasion control is selected based on the load capacity.

Alternatively, in consideration of time delay which may occur when the backlash band evasion control is canceled to switch to the control in the existing normal mode, when the driving torque as the required torque exceeds a value of a set ratio (less than 100%) to the magnitude (absolute value magnitude) of the maximum positive (+) directional torque which may be output by the rear wheel motor 41, or the regenerative torque as the required torque exceeds a value of a set ratio (less than 100%) to the magnitude (absolute value magnitude) of the maximum negative (−) directional torque which may be output by the front wheel motor 31, the backlash band evasion control may be canceled and suspended to switch to control in the existing normal mode.

Alternatively, a cancellation criterion of the backlash band evasion control may be determined based on whether a preset torque threshold value (absolute value) is exceeded. Here, the set ratio (%) to the maximum torque or the torque threshold value for determining whether to cancel the backlash band evasion control may be determined through a map using a predetermined vehicle state variable or a drive system state variable as input thereof.

At the present time, the controller 20 may be configured to determine execution and cancellation of the backlash band evasion control by determining the required torque based on the accelerator pedal input value (APS value) or the brake pedal input value (BPS value), determining the total torque command based on the required torque, then determining the front wheel torque command and the rear wheel torque command from the total torque command through the front wheel and rear wheel torque distribution process, and then comparing the front wheel torque command and the rear wheel torque command with a front wheel torque lower limit value and a rear wheel torque upper limit value, respectively.

In more detail, in an acceleration situation where the driver depresses the accelerator pedal, and when only the torque of the rear wheel motor 41 is sufficient to follow the required driving torque, which is the required torque for vehicle acceleration, the aforementioned backlash band evasion control is executed.

However, when only the torque of the rear wheel motor 41 is insufficient to follow the required driving torque, the backlash band evasion control may be cancelled and suspended. As a result, the torque of the front wheel motor 31 may be controlled in a torque range equal to or greater than the maximum front wheel torque threshold value of the backlash band evasion control set to a negative (−) torque value.

At the present time, when the accelerator pedal input value (APS value) increases and the required driving torque for accelerating the vehicle exceeds the preset rear wheel torque upper limit value, the rear wheel torque command is limited to the rear wheel torque upper limit value as illustrated in FIG. 5.

That is, the rear wheel torque command may be determined as the rear wheel torque upper limit value, and the front wheel torque command may be determined as a torque value equal to or greater than the maximum front wheel torque threshold value. At the instant time, the front wheel torque command may be determined as a positive (+) torque value. It is obvious that, even in the instant case, the front wheel torque and the rear wheel torque command are determined so that the sum torque command obtained by summing the front wheel torque and the rear wheel torque command becomes a value that satisfies the required driving torque.

Furthermore, in a deceleration situation where the driver depresses the brake pedal, and when only the torque of the front wheel motor 31 is sufficient to follow the required regenerative torque, which is the required torque for vehicle deceleration, the aforementioned backlash band evasion control is executed.

However, when only the torque of the front wheel motor 31 is insufficient to follow the required regenerative torque, the backlash band evasion control may be canceled and suspended, and the torque of the rear wheel motor 41 may be controlled in a torque range less than or equal to the minimum rear wheel torque threshold value of the backlash band evasion control set to a positive (+) torque value.

That is, when the brake pedal input value (BPS value) increases and the required regenerative torque for decelerating the vehicle becomes less than the preset front wheel torque lower limit value, as illustrated in FIG. 5, the front wheel torque command is limited to the front wheel torque lower limit value.

At the present time, the front wheel torque command may be determined as the front wheel torque lower limit value, and the rear wheel torque command may be determined as a torque value less than or equal to the minimum rear wheel torque threshold value. At the instant time, the rear wheel torque command may be determined with a negative (−) torque value. Itis obvious that, even in the instant case, the front wheel torque and the rear wheel torque command are determined so that the sum torque command obtained by summing the front wheel torque and the rear wheel torque command becomes a value that satisfies the required regenerative torque.

Furthermore, when the backlash band evasion control is canceled and suspended, in case of zero-crossing in which the torque direction of the front wheel motor 31 or the torque direction of the rear wheel motor 41 is reversed, the motor torque inevitably enters the backlash band. At the instant time, to mitigate the backlash problem, a known control method such as torque slope control and torque amount correction control for backlash mitigation may be executed.

Furthermore, cancellation of the backlash band evasion control according to the increase in load capacity may be independently performed for the case of a positive (+) directional torque increase and the case of a negative (−) directional torque increase.

That is, the backlash band evasion control may be canceled only when the required driving torque cannot be sufficiently handled only by the rear wheel motor 41, and the backlash band evasion control may be maintained when the required regenerative torque cannot be sufficiently handled only by the front wheel motor 31.

Furthermore, the backlash band evasion control may be maintained when the required driving torque cannot be sufficiently handled only by the rear wheel motor 41, and the backlash band evasion control may be maintained only when the required regenerative torque cannot be sufficiently handled only by the rear wheel motor 41.

Furthermore, the backlash band evasion control may be cancelled in both the case where the required driving torque cannot be sufficiently handled only by the rear wheel motor 41 and the case where the requested regenerative torque cannot be sufficiently handled only by the front wheel motor 31.

Next, it is possible to determine the on or OFF states of the backlash band evasion mode based on the driving mode (based on purpose), and such an exemplary embodiment will be described.

As in the case of determination based on the required load capacity, instead of allowing the driver to manually operate the interface 12 to turn on or off the responsiveness priority mode (backlash band evasion mode), the on or OFF states of the backlash band evasion mode may be automatically selected according to the driving mode.

Furthermore, after determining whether the backlash band evasion mode is turned on or off according to the driving mode in step S2 of FIG. 3, the controller 20 is configured to perform steps S3 and S7 and subsequent steps in the same manner as described in the required load capacity-based embodiment.

There is a situation that requires precise longitudinal load movement control through maximum acceleration/deceleration response according to driving input of the driver rather than maximum output. In the present situation, it is reasonable to execute the backlash band evasion control, and in other situations, the existing driving control strategy may be applied to generate maximum output.

In the present way, it is possible to determine whether to execute or cancel the backlash band evasion control according to the purpose of each situation. As mentioned above, the following situations are situations in which precise and rapid acceleration/deceleration response is more important than maximum output.

The backlash band evasion control may be selectively executed or cancelled for each situation. Furthermore, a UI allowing the driver to select whether to execute or cancel the backlash band evasion control in a certain situation and driving mode may be provided through the interface 12.

In various exemplary embodiments of the present disclosure, a driving mode in which the on or OFF states of the backlash band evasion mode are automatically selectable may include at least one of a track mode, a cornering mode, the responsiveness priority mode, or a drift mode. A detailed description of each mode is as follows.

Track Mode

Technology that induces fun-driving on a track based on track information including track location information and track route information (including turning section information) obtained in advance and real-time vehicle location information has been applied to mass production.

In an exemplary embodiment of the present disclosure, the controller 20 may be set to determine that the vehicle enters the track based on the track location information, and then automatically determine whether to execute backlash band evasion control which may minimize lap time based on the track route information including the turning section information and the real-time vehicle location information on the track during the track mode in which the vehicle travels along the track.

By the present determination, the backlash band evasion mode may be automatically turned on or off according to the vehicle location on a track route without the driver manually selecting the ON or OFF states of the backlash band evasion mode.

Figure 6:
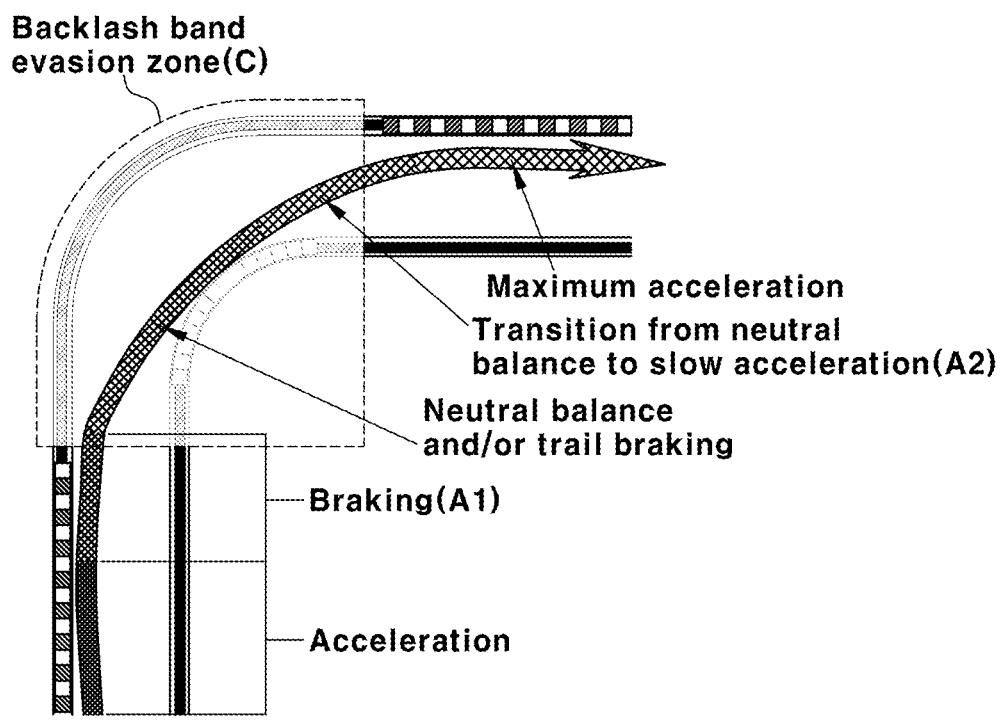
FIG. 6 is a diagram illustrating a section in which backlash band evasion control is executed in a track mode in an exemplary embodiment of the present disclosure.

FIG. 6 is a diagram illustrating an acceleration/deceleration guide for ideal track turning behavior in an exemplary embodiment of the present disclosure, and illustrates a section C in which the backlash band evasion control may be executed during the track mode.

Referring to FIG. 6, a turning section C on the track is set as a section ("backlash band evasion zone") in which the backlash band evasion control may be executed.

Referring to FIG. 6, maximum acceleration torque is not used from at least a part of the end of a braking section marked "A1" and "Braking" to a part of a gradual acceleration section marked "A2."

Furthermore, maximum acceleration torque is not required in an even-throttle or neutral balance section that requires precise longitudinal load movement control and responsiveness of the vehicle.

Therefore, it is significantly effective to enable the backlash band evasion control to be executed only while the vehicle passes the turning section C. Therefore, in the exemplary embodiment of the present disclosure, the controller 20 automatically turns on the backlash band evasion mode only while the vehicle passes the turning section C based on the track information and the real-time vehicle location information on the track.

When the driving mode of the vehicle is the track mode in which the turning section C is passed, the controller 20 may be configured to determine that the backlash band evasion mode is automatically turned on in step S2 of FIG. 3, and then perform steps S3 to S6 and step S10. It is obvious that, upon determining that the backlash band evasion mode is turned off in step S2 of FIG. 3, the controller 20 may perform steps S7 to S10 thereafter.

Cornering Mode

While including the same purpose as that of the track mode, in the cornering mode, it is possible to automatically switch to execution of the backlash band evasion control without using the track information and the vehicle location information used in the track mode.

To the present end, the controller 20 may be set to determine that the vehicle is driven in the turning section based on vehicle driving information obtained by the sensor 12, not track information, such as vehicle lateral acceleration, a vehicle yaw angular speed, and a steering angle indicating the vehicle driving state, and to execute the backlash band evasion control during the cornering mode in which the vehicle is driven in the turning section thereafter.

At the present time, when at least one of the vehicle lateral acceleration, the vehicle yaw angular speed, or the steering angle, which are vehicle driving state values, exceeds each preset threshold value, the controller 20 is configured to determine that the driving mode of the vehicle is the cornering mode, and automatically turns on the backlash band evasion mode so that the backlash band evasion control is executed.

Conversely, when the vehicle driving state values are in a region less than or equal to the corresponding threshold value for a certain time period, or when the required torque (or the sum of the front wheel torque command and the rear wheel torque command) exceeds a predetermined threshold value, the backlash band evasion mode may be turned off.

In step S2 of FIG. 3, the controller 20 may be configured to determine that the backlash band evasion mode is automatically turned on when the driving mode of the vehicle is the cornering mode, and then perform steps S3 to S6 and step S10. It is obvious that, upon determining that the backlash band evasion mode is turned off in step S2 of FIG. 3, the controller 20 may perform steps S7 to S10 thereafter.

Responsiveness Priority Mode

Rather than the vehicle determining whether to execute the backlash band evasion control by automatic determination for each situation as described above, the driver may be allowed to select a responsiveness priority mode (backlash band evasion mode), which prioritizes responsiveness rather than vehicle acceleration performance.

That is, as the driver turns ON/OFF the responsiveness priority mode, the backlash band evasion control is selectively executed and canceled, and the present responsiveness priority mode has been described above with reference to FIG. 4B.

When the driver turns on the responsiveness priority mode, the backlash band evasion control process is executed, and when the driver turns off the responsiveness priority mode, the backlash band evasion control is cancelled and not executed.

Drift Mode

Another special case in which the backlash band evasion control may be executed at all times is when the vehicle enters the drift mode. Because the drift mode is a mode in which slip is artificially generated in the rear wheels by applying torque mainly to the rear wheels, when the vehicle enters the drift mode, a situation in which torque needs to be generated in both the front wheels and the rear wheels does not occur.

Moreover, precise and high acceleration/deceleration response and accuracy are required to maintain an appropriate amount of slip after the start of rear wheel slip for drift. Therefore, it is significantly effective to perform the backlash band evasion control in association with the drift mode.

In step S2 of FIG. 3, the controller 20 may be configured to determine that the backlash band evasion mode is automatically turned on when the driving mode of the vehicle is the drift mode, and then perform steps S3 to S6 and step S10. It is obvious that, upon determining that the backlash band evasion mode is turned off in step S2 of FIG. 3, the controller 20 may perform steps S7 to S10 thereafter.

Because the drift mode is entered by operation of the driver, the controller 20 may be configured to determine whether to turn on or off the backlash band evasion mode in association with entry into the drift mode according to an operation of the driver.

In the present way, the exemplary embodiment of the present disclosure has been described in detail. The ON state of the backlash band evasion mode is a state in which the backlash band evasion mode and the backlash band evasion control are executed, and the OFF state of the backlash band evasion mode is a state in which the mode is cancelled so that the backlash band evasion mode and the backlash band evasion control are not executed.

In an exemplary embodiment of the present disclosure, the backlash band evasion mode may include at least one of a mode in which the backlash band evasion control is automatically executed and cancelled based on the required load capacity of the vehicle, or a mode in which the backlash band evasion control is automatically executed and cancelled based on the driving mode of the vehicle. Here, the driving mode may include the track mode, the cornering mode, the responsiveness priority mode, and the drift mode as described above.

According to an exemplary embodiment of the present disclosure described above, the backlash band evasion control of the drive system is executed, and motor control specialized for the high-performance driving mode is performed, so that occurrence of backlash itself may be prevented. Because the motor is used only in a torque range irrelevant to backlash, backlash vibration and noise impact problems may be effectively solved.

Furthermore, because driving force may be generated without concern about backlash problems, longitudinal responsiveness of the vehicle may be greatly improved. A driving mode emphasizing direct connection for high-performance electric vehicles may be provided, convenience and accuracy of load movement control when turning on a track may be improved, and ease of use of a special driving mode such as a drift mode may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling torque of a drive system of an electric vehicle, the method comprising:
   determining, by a controller, required torque according to a vehicle driving state while the vehicle is driven, and determining a total torque command based on the determined required torque; and
   performing, by the controller, a front wheel and rear wheel torque distribution process on the total torque command, so that a front wheel torque command and a rear wheel torque command following the total torque command are determined,
   wherein, the front wheel torque command is determined as a value less than or equal to a maximum front wheel torque threshold value set as a negative (−) torque value,
   wherein the rear wheel torque command is determined as a value greater than or equal to a minimum rear wheel torque threshold value set as a positive (+) torque value, and
   wherein, in a response that an ON state of a responsiveness priority mode is selected and input by a driver, the controller is configured to perform backlash band evasion control for determining the front wheel torque command as a value less than or equal to the maximum front wheel torque threshold value and determining the rear wheel torque command as a value greater than or equal to the minimum rear wheel torque threshold value.

2. The method of claim 1,
   wherein the maximum torque threshold value is set to a value less than a lower limit threshold value of a backlash band, which is a torque region where there is possibility that backlash occurs in a front wheel drive system, and
   wherein the minimum torque threshold value is set to a value greater than an upper limit threshold value of a backlash band, which is a torque region where there is possibility that backlash occurs in a rear wheel drive system.

3. The method of claim 1, wherein the backlash band of the front wheel drive system and the backlash band of the rear wheel drive system are each set to a torque range including 0 torque while bordering a lower limit threshold value, which is a negative (−) value, and an upper limit threshold value, which is a positive (+) value.

4. The method of claim 1, wherein the determining of the front wheel torque command and the rear wheel torque command includes determining the front wheel torque command and the rear wheel torque command so that a sum of the front wheel torque command and the rear wheel torque command follows the total torque command.

5. The method of claim 1,
wherein the determining of the front wheel torque command and the rear wheel torque command includes comparing, by the controller, the total torque command with the maximum front wheel torque threshold value, and determining the front wheel torque command as the maximum front wheel torque threshold value when the total torque command is greater than the maximum front wheel torque threshold value, and
wherein the rear wheel torque command is determined as a value obtained by subtracting the determined front wheel torque command from the total torque command.

6. The method of claim 1,
wherein the determining of the front wheel torque command and the rear wheel torque command includes comparing, by the controller, the total torque command with the minimum rear wheel torque threshold value, and determining the rear wheel torque command as the minimum rear wheel torque threshold value when the total torque command is less than or equal to the minimum rear wheel torque threshold value, and
wherein the front wheel torque command is determined as a value obtained by subtracting the determined rear wheel torque command from the total torque command.

7. The method of claim 1, wherein the controller is configured to selectively execute or cancel backlash band evasion control for determining the front wheel torque command as a value less than or equal to the maximum front wheel torque threshold value and determining the rear wheel torque command as a value greater than or equal to the minimum rear wheel torque threshold value according to required load capacity of the vehicle.

8. The method of claim 7, wherein the required load capacity is required torque determined based on an accelerator pedal input value and a brake pedal input value of a driver.

9. The method of claim 8, wherein the controller is configured to cancel the backlash band evasion control when driving torque for accelerating the vehicle as the required torque is greater than a magnitude of maximum positive (+) direction torque allowed to be output by a rear wheel motor, a value of a set ratio to the magnitude of the maximum positive (+) direction torque, or a set torque threshold value.

10. The method of claim 8, wherein the controller is configured to cancel the backlash band evasion control when regenerative torque for decelerating the vehicle as the required torque is greater than a magnitude of an absolute value of maximum negative (−) direction torque allowed to be output by a front wheel motor, a value of a set ratio to the magnitude of the absolute value of the maximum negative (−) direction torque, or a set torque threshold value.

11. The method of claim 1, wherein the controller is configured to selectively execute or cancel backlash band evasion control for determining the front wheel torque command as a value less than or equal to the maximum front wheel torque threshold value and determining the rear wheel torque command as a value greater than or equal to the minimum rear wheel torque threshold value according to a driving mode of the vehicle.

12. The method of claim 11, wherein the driving mode includes at least one of a track mode, a cornering mode, or a drift mode.

13. The method of claim 12, wherein the controller is configured to determine that the vehicle enters a track based on track information and real-time vehicle location information, and execute the backlash band evasion control in a turning section of the track during the track mode in which the vehicle travels along the track.

14. The method of claim 12, wherein the controller is configured to determine that the driving mode of the vehicle is the cornering mode in which the vehicle travels in a turning section based on vehicle driving information obtained by a sensor, and then execute the backlash band evasion control during the cornering mode.

15. The method of claim 14, wherein the controller is configured to determine that the driving mode of the vehicle is the cornering mode and execute the backlash band evasion control when at least one value of a vehicle lateral acceleration, a vehicle yaw angular speed, or a steering angle as the vehicle driving information exceeds each preset threshold value.

16. The method of claim 12, wherein the controller is configured to execute the backlash band evasion control upon determining that the vehicle enters the drift mode.

17. A drive system of a vehicle, the drive system comprising:
a sensor configured for detecting vehicle driving information of the vehicle;
a processor connected to the sensor and configured for:
determining required torque according to a vehicle driving state while the vehicle is driven, based on the detected vehicle driving information, and determining a total torque command based on the determined required torque; and
performing a front wheel and rear wheel torque distribution process on the total torque command, so that a front wheel torque command and a rear wheel torque command following the total torque command are determined,
a non-transitory storage medium configured for storing an algorithm for an operation of the processor,
wherein, the front wheel torque command is determined as a value less than or equal to a maximum front wheel torque threshold value set as a negative (−) torque value,
wherein the rear wheel torque command is determined as a value greater than or equal to a minimum rear wheel torque threshold value set as a positive (+) torque value, and
wherein, in a response that an ON state of a responsiveness priority mode is selected and input by a driver, the processor is configured to perform backlash band evasion control for determining the front wheel torque command as a value less than or equal to the maximum front wheel torque threshold value and determining the rear wheel torque command as a value greater than or equal to the minimum rear wheel torque threshold value.

18. The drive system of claim 17, wherein in the determining of the front wheel torque command and the rear wheel torque command, the controller processor is configured for determining the front wheel torque command and the rear wheel torque command so that a sum of the front wheel torque command and the rear wheel torque command follows the total torque command.

19. The drive system of claim 17, wherein in the determining of the front wheel torque command and the rear wheel torque command, when the total torque command is greater than the maximum front wheel torque threshold value, the processor is configured for comparing the total torque command with the maximum front wheel torque threshold value, and for determining the front wheel torque command as the maximum front wheel torque threshold value, wherein the rear wheel torque command is determined as a value obtained by subtracting the determined front wheel torque command from the total torque command, and when the total torque command is less than or equal to the minimum rear wheel torque threshold value, the controller is configured for comparing the total torque command with the minimum rear wheel torque threshold value, and for determining the rear wheel torque command as the minimum rear wheel torque threshold value, wherein the front wheel torque command is determined as a value obtained by subtracting the determined rear wheel torque command from the total torque command.

* * * * *